United States Patent
Batruni

(10) Patent No.: US 10,671,697 B1
(45) Date of Patent: Jun. 2, 2020

(54) ITERATIVE AND EFFICIENT TECHNIQUE FOR SINGULAR VALUE DECOMPOSITION

(71) Applicant: Cyber Atomics, Inc., Danville, CA (US)

(72) Inventor: Roy Batruni, Danville, CA (US)

(73) Assignee: Cyber Atomics, Inc., Danville, CA (US)

( * ) Notice: Subject to any disclaimer, the term of this patent is extended or adjusted under 35 U.S.C. 154(b) by 10 days.

(21) Appl. No.: 15/901,281

(22) Filed: Feb. 21, 2018

Related U.S. Application Data

(60) Provisional application No. 62/463,433, filed on Feb. 24, 2017.

(51) Int. Cl.
*G06F 17/16* (2006.01)
*G06F 7/78* (2006.01)

(52) U.S. Cl.
CPC ................ *G06F 17/16* (2013.01); *G06F 7/78* (2013.01)

(58) Field of Classification Search
CPC .................................. G06F 17/16; G06F 7/78
USPC ......................................................... 708/520
See application file for complete search history.

(56) References Cited

U.S. PATENT DOCUMENTS

| | | | |
|---|---|---|---|
| 9,697,177 B1* | 7/2017 | Cairns ..................... | G06F 17/16 |
| 2006/0155798 A1* | 7/2006 | Ketchum ................. | G06F 17/16 708/607 |
| 2009/0216821 A1* | 8/2009 | Nakamura ............... | G06F 17/16 708/446 |
| 2015/0220622 A1* | 8/2015 | Modarresi ............. | G06F 16/283 707/748 |
| 2016/0055124 A1* | 2/2016 | Galvin ..................... | G06F 17/16 707/741 |

* cited by examiner

*Primary Examiner* — Tan V Mai
(74) *Attorney, Agent, or Firm* — Van Pelt, Yi & James LLP

(57) ABSTRACT

Matrix processing includes: accessing an original matrix; iteratively determining a plurality of estimated singular vectors of the original matrix, a plurality of estimated singular values of the original matrix, or both, using a plurality of iteration cycles; wherein at least some of the plurality of iteration cycles are performed in parallel on a plurality of processors; and outputting the plurality of estimated singular vectors of the original matrix, the plurality of estimated singular values of the original matrix, or both.

21 Claims, 10 Drawing Sheets

US 10,671,697 B1

ITERATIVE AND EFFICIENT TECHNIQUE FOR SINGULAR VALUE DECOMPOSITION

CROSS REFERENCE TO OTHER APPLICATIONS

This application claims priority to U.S. Provisional Patent Application No. 62/463,433 entitled FAST COMPUTATION OF SVD filed Feb. 24, 2017 which is incorporated herein by reference for all purposes.

BACKGROUND OF THE INVENTION

Modern computer applications often involve gathering and processing large amounts of information (e.g., databases with hundreds of thousands of rows or more). Applications that process high volumes of data (sometimes referred to as "big data" applications) are very computationally intensive. Many big data applications employ common data analytics tools to perform analytical operations such as data clustering, classification, de-noising, etc. Big data applications often require large amounts of hardware resources and power to support the computationally intensive analytical operations. It would be useful to simplify these analytical operations and make them more computationally efficient in order to conserve computational resources and power. Further, in certain real-time applications (e.g., image/facial recognition, service logistics, consumer product recommendation on large scale e-commerce platforms, etc.), there are rather stringent speed requirements. Currently, these applications often are performed by large servers due to the processing requirements. It would be useful to simplify the processing operations to allow them to execute on devices with less powerful processors and fewer memories (e.g., on personal computers, mobile phones, etc.).

Many analytics tools perform singular value decomposition (SVD) as a part of the data processing operation. For example, in some search applications, keywords in documents are sometimes first arranged in a large matrix, with rows corresponding to keywords, columns corresponding to documents to be searched, and entries corresponding to the strength of the keyword-document association. To perform a search of a set of key words, SVD is performed on the matrix, the most significant singular values and their associated singular vectors are extracted and used to create a simplified matrix with much less clutter, then the elements of "search hints" that are most relevant to the intent of the search are narrowed down. For large scale searches (e.g., Internet searches), the numbers of keywords and documents are huge and ever increasing, which means the size of the matrix to be computed is also huge and ever increasing. A more efficient technique to perform SVD would result in faster response time as well as savings in computing and networking resources and power.

Currently, SVD is typically computed using Cholesky decomposition. For large matrices, a large number of computations are required, and thus a more efficient way to compute SVD is desirable. Further, the typical implementation of Cholesky decomposition computes the singular values of a matrix in a sequential manner. In other words, there are usually multiple stages of computation, where each stage depends on the value of the previous stage, therefore the computation is typically carried out on one processor at a time without the benefit of parallel processing. Thus, it would also be desirable if the process can be implemented in a way that takes advantage of modern multi-processor architecture and be able to execute in a pipelined, parallelized fashion.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A regular iterative technique for performing singular value decomposition is disclosed. The technique estimates the singular values of an original matrix using a plurality of iteration cycles, and is more computationally efficient than conventional techniques. At least some of the iteration operations are parallelizable and can be performed on a plurality of processors, achieving further gain in computational speed over conventional techniques.

Figure 1:
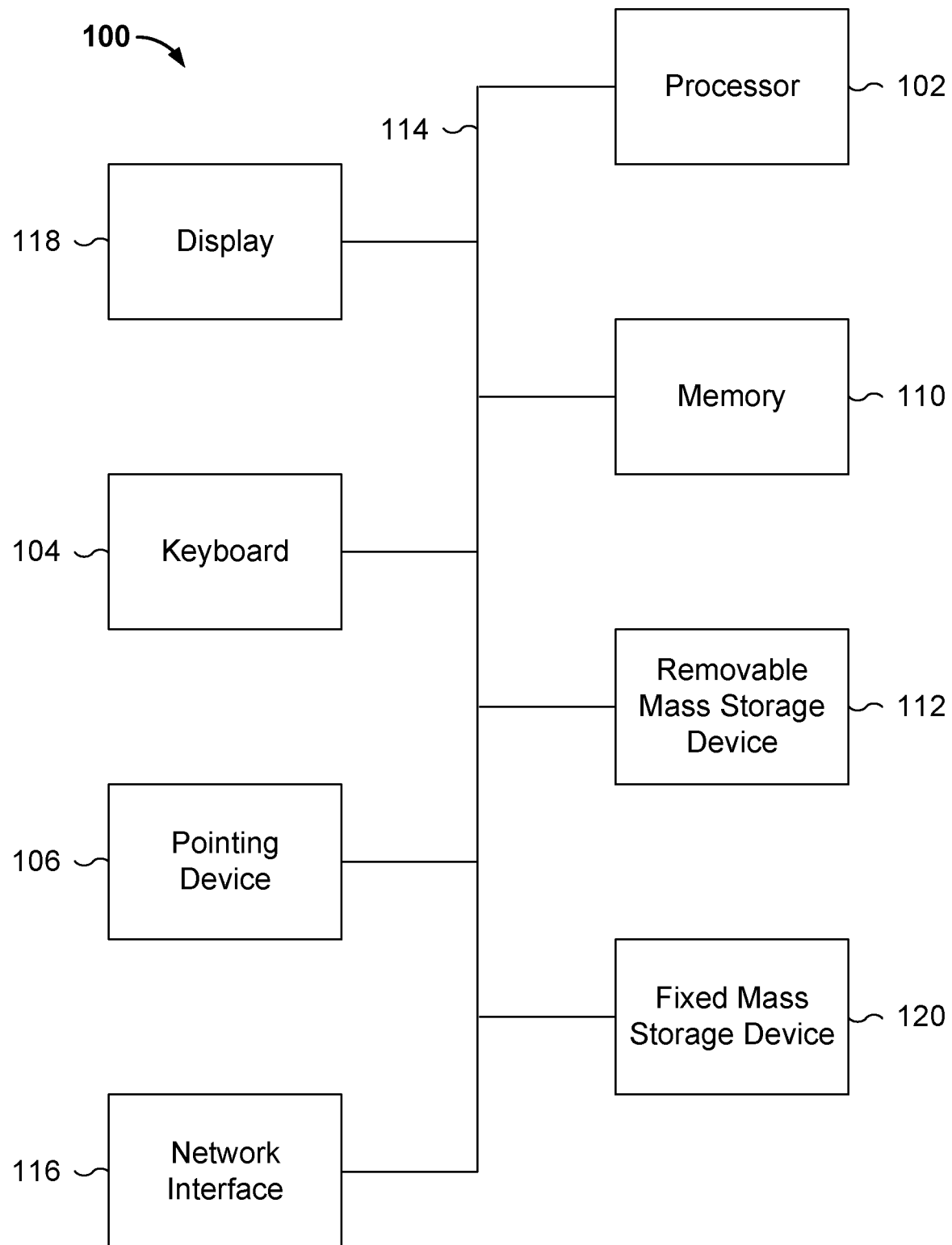
FIG. 1 is a block diagram illustrating an embodiment of a system configured to determine the singular values of a matrix.

FIG. 1 is a block diagram illustrating an embodiment of a system configured to determine the singular values of a matrix.

As will be apparent, other computer system architectures and configurations can be used to perform SVD. Computer system 100, which includes various subsystems as described below, includes at least one processing subsystem (also referred to as a processor) 102. For example, processor 102 can be implemented by a single-chip processor or by multiple processors/cores operating on the same device or on multiple devices. In some embodiments, processor 102 includes one or more general purpose digital processors (e.g., one or more central processing units) that control the operation of the computer system 100. Using instructions retrieved from memory 110, the processor 102 controls the reception and manipulation of input data, and the output and display of data on output devices (e.g., display 118). In some embodiments, processor 102 includes one or more of: microprocessor, digital signal processor (DSP), field programmable gate array (FPGA), application specific integrated circuit (ASIC), graphical processing units (GPU), and/or other appropriate circuit components. In some embodiments, processor 102 is implemented using one or more hardware components and/or virtual machines that are configured to execute in parallel.

Processor 102 is coupled bi-directionally with memory 110, which can include a first primary storage, typically a random access memory (RAM), and a second primary storage area, typically a read-only memory (ROM). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as is well known in the art, primary storage typically includes basic operating instructions, program code, data and objects used by the processor 102 to perform its functions (e.g., programmed instructions). For example, memory 110 can include any suitable computer-readable storage media, described below, depending on whether, for example, data access needs to be bi-directional or uni-directional. For example, processor 102 can also directly and very rapidly retrieve and store frequently needed data in a cache memory (not shown).

A removable mass storage device 112 provides additional data storage capacity for the computer system 100, and is coupled either bi-directionally (read/write) or uni-directionally (read only) to processor 102. For example, storage 112 can also include computer-readable media such as magnetic tape, flash memory, PC-CARDS, portable mass storage devices, holographic storage devices, and other storage devices. A fixed mass storage 120 can also, for example, provide additional data storage capacity. The most common example of mass storage 120 is a hard disk drive. Mass storage 112, 120 generally store additional programming instructions, data, and the like that typically are not in active use by the processor 102. It will be appreciated that the information retained within mass storage 112 and 120 can be incorporated, if needed, in standard fashion as part of memory 110 (e.g., RAM) as virtual memory.

In addition to providing processor 102 access to storage subsystems, bus 114 can also be used to provide access to other subsystems and devices. As shown, these can include a display monitor 118, a network interface 116, a keyboard 104, and a pointing device 106, as well as an auxiliary input/output device interface, a sound card, speakers, and other subsystems as needed. For example, the pointing device 106 can be a mouse, stylus, track ball, or tablet, and is useful for interacting with a graphical user interface.

The network interface 116 allows processor 102 to be coupled to another computer, computer network, or telecommunications network using a network connection as shown. For example, through the network interface 116, the processor 102 can receive information (e.g., data objects or program instructions) from another network or output information to another network in the course of performing method/process steps. Information, often represented as a sequence of instructions to be executed on a processor, can be received from and outputted to another network. An interface card or similar device and appropriate software implemented by (e.g., executed/performed on) processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Additional mass storage devices (not shown) can also be connected to processor 102 through network interface 116.

An auxiliary I/O device interface (not shown) can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: magnetic media such as hard disks, floppy disks, and magnetic tape; optical media such as CD-ROM disks; magneto-optical media such as optical disks; and specially configured hardware devices such as application-specific integrated circuits (ASICs), programmable logic devices (PLDs), and ROM and RAM devices. Examples of program code include both machine code, as produced, for example, by a compiler, or files containing higher level code (e.g., script) that can be executed using an interpreter.

The computer system shown in FIG. 1 is but an example of a computer system suitable for use with the various embodiments disclosed herein. Other computer systems suitable for such use can include additional or fewer subsystems. For example, a cloud-based system comprising multiple computers can be used. In addition, bus 114 is illustrative of any interconnection scheme serving to link the subsystems. Other computer architectures having different configurations of subsystems can also be utilized.

Figure 2:
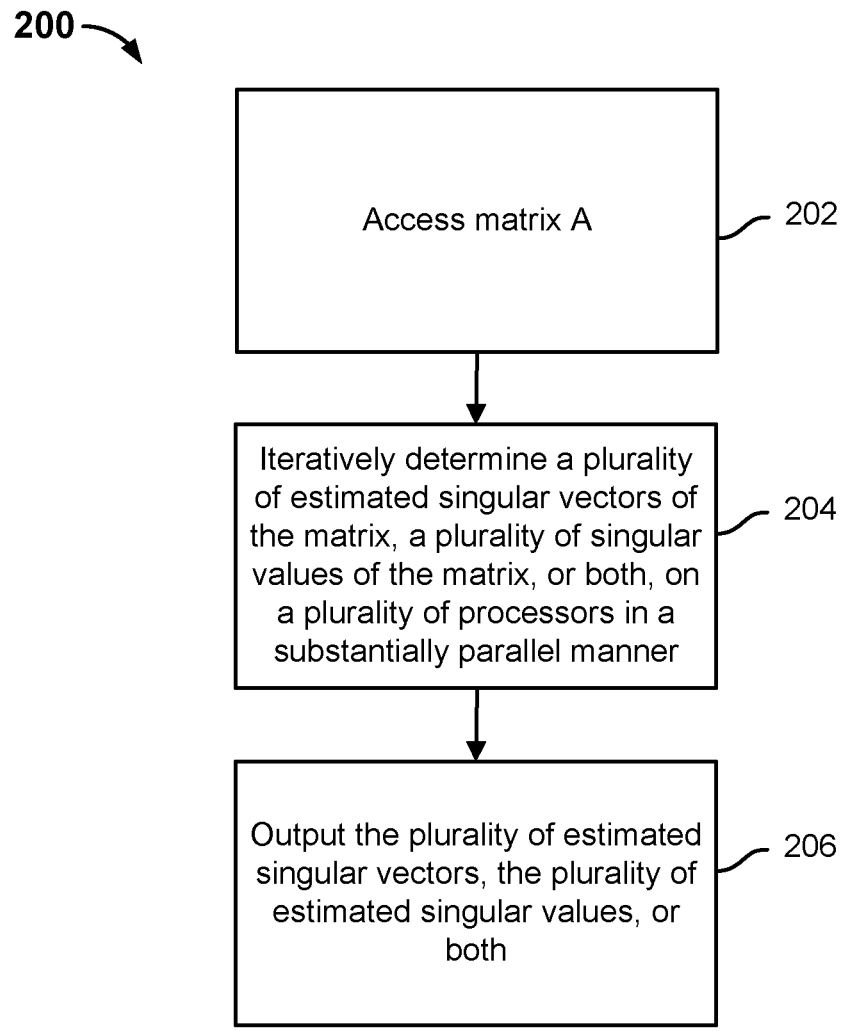
FIG. 2 is a flowchart illustrating an embodiment of an iterative process for performing a singular value decomposition of a matrix.

FIG. 2 is a flowchart illustrating an embodiment of an iterative process for performing a singular value decomposition of a matrix.

Process 200 can be performed on a system such as 100, 300, or 400.

At 202, a matrix is accessed. The matrix can be received as a received input, read or otherwise loaded into memory from a storage location, etc. It can be accessed via a pointer or reference.

At 204, a plurality of estimated singular vectors of the matrix, a plurality of estimated singular values of the matrix, or both, are determined iteratively. For a symmetric matrix, the singular vectors are also referred to as eigenvectors and the singular values are also referred to as eigenvalues.

As will be described in greater detail below, in some embodiments, the iterative determination includes updating an estimated singular vector, normalizing the updated estimated singular vector, and determining an estimated singular value. The estimated values/vectors do not need to match the actual singular values/singular vectors of the matrix exactly, but can be values/vectors that converge to the actual value. The output of one stage can be used as an input to the next stage in a pipelined fashion, and at least some of the iteration operations are performed in on a plurality of processors in a highly parallelized manner. Thus, computation time is greatly improved over conventional techniques. Further, the regular iterative technique does not require matrix-matrix multiplications and allow matrix-vector computations to be carried out in a highly efficient manner to conserve computational resources such as processor cycles, memory, power, etc. Moreover, the process is highly systolic, where data in the processing pipeline moves in an ordered, regular way, making the process more amenable to be implemented using specialized hardware such as ASIC, FPGA, GPU, etc., than existing techniques for obtaining matrix properties.

At 206, the estimated singular vectors, the estimated singular values, or both, are output. In various embodiments, the estimated singular vectors and/or estimated singular values are output to one or more analytics engines that rely on the estimated singular vectors/singular values to perform analysis. Examples of the analytics engines include: a search application in which the original matrix represent occurrences of words, phrases, pixel values, etc. in searchable documents such as texts, images, videos, etc. and the estimated singular vectors are used to identify the best matches (which correspond to the greatest singular values); a clustering application where the data to be clustered are represented as one or more matrices, and clustering is performed by multiplying the matrices with their singular values, a de-noising application, a compression application where a set of singular values that represents most of the energy of a matrix (e.g., an image) is stored instead of the original matrix. Many other applications are possible. The outputs can also be stored for later use, displayed in a user interface display, etc.

It is possible to start with a random estimate of a singular vector, and through iterations to update the estimated singular vector and re-normalize until the estimated singular vector converges with the true singular vector. The following describes the basis for this feasibility.

A matrix A can be written in terms of its singular value (SV) components as:

$$A = \sum_{j=1}^{M} \sigma_j \, u_j \, u'_j = U\Sigma U' \qquad (1)$$

where M is an integer value where M=N if the matrix is full rank, otherwise M<N. j is an integer between 1 and M. $\sigma_a$ is the j-th singular value (in the case of SPD matrix, the eigenvalue). $u_j$ is the j-th singular vector, and $u'_j$ is the corresponding transpose vector of $u_j$. As used herein, the singular vector is also referred to as the principal vector, and in the case of a SPD matrix, its singular vector is also its eigenvector. Further, $$\Sigma = \begin{bmatrix} \sigma_1 & 0 & 0 \\ 0 & \ddots & 0 \\ 0 & 0 & \sigma_N \end{bmatrix}$$

is the diagonal singular value matrix.

The above matrix A can be rewritten in expansion forms as follows:

$$A = \sigma_1 u_1 u_1' + \sigma_2 u_2 u_2' + \ldots + \sigma_N u_N u_N' \qquad (2)$$

$$A = \sigma_1 \mathbb{U}_1 + \sigma_2 \mathbb{U}_2 + \ldots + \sigma_N \mathbb{U}_N \qquad (3)$$

where (2) corresponds to the SVD expansion of matrix A, and (3) corresponds to the Frobenius expansion of matrix A.

In the Frobenius expansion, the Frobenius vector $\mathbb{U}_j = u_j u_j'$ is a rank-1 matrix that represents the j-th term in the Frobenius expansion of the matrix A.

Further, the following orthonormality condition holds:

$$u'_j u_k = \begin{cases} 1 & \text{if } j = k \\ 0 & \text{if } j \neq k \end{cases} \qquad (4)$$

Thus, in the Frobenius sense, (that is, applying Frobenius product instead of standard vector product to examine the properties and relationships between matrices), the following are true:

$$\mathbb{U}_j \perp \mathbb{U}_k \text{ for } j \neq k$$

$$\mathbb{U}_j \perp_F \mathbb{U}_k \text{ for } j \neq k$$

$$\mathbb{U}_j \#_F \mathbb{U}_k \text{ for } j = k$$

where $\perp_F$ indicates "Frobenius-orthogonal" and where $\#_F$ indicates "Frobenius equal and parallel to" which actually means that $\mathbb{U}_j$ is normal in the Frobenius-sense for all j. Thus, for the Frobenius matrix product:

$$\sum_{n=1}^{N} \sum_{m=1}^{N} (\mathbb{U}_j \otimes \mathbb{U}_k) = \begin{cases} 0 & \text{for } j \neq k \\ 1 & \text{for } j = k \end{cases}$$

where $\otimes$ indicating element-by-element products of $\mathbb{U}_j$ and $\mathbb{U}_k$, and the summations are over rows and columns. The Frobenius matrix product is therefore obtained by multiplying the corresponding elements of two matrices and summing all the outputs (matrix equivalent of vector inner product). The following shorthand is used to express the Frobenius product of two matrices:

$$y = \mathbb{U}_j \times_F \mathbb{U}_k$$

where the output y is a scalar.

Note that each Frobenius plane $\mathbb{U}_1$ is a rank-1 matrix, and when used in the SVD context, each $\mathbb{U}_j$ is an outer product of the singular vectors (that is, $\mathbb{U}_j = u_j u_j'$), which produces the Frobenius-orthonormal property.

Take the Frobenius expansion of equation (3) and Frobenius-multiply both sides by $\mathbb{U}_j$ gives $$A \times_F \mathbb{U}_j = (\sigma_1 \mathbb{U}_1 + \sigma_2 \mathbb{U}_2 + \ldots + \sigma_N \mathbb{U}_N) \times_F \mathbb{U}_j = \sigma_1(\mathbb{U}_1 \times_F \mathbb{U}_j) + \sigma_2(\mathbb{U}_2 \times_F \mathbb{U}_j) + \ldots + \sigma_N(\mathbb{U}_N \times_F \mathbb{U}_j) = \sigma_j(\mathbb{U}_j \times_F \mathbb{U}_j) = \sigma_j \quad (5)$$

Thus, if the j-th Frobenius plane (that is, matrix $\mathbb{U}_j$) is known, the j-th singular value $\sigma_j$ can be obtained by applying a Frobenius product $A \times_F \mathbb{U}_j$.

In practice, matrices $\mathbb{U}_j$ are not known, but can be estimated. It is known that $\mathbb{U}_j$ is a rank-1 symmetric matrix, and its estimation is denoted as $\tilde{\mathbb{U}}_j$, which has the following structure:

$$\tilde{\mathbb{U}}_j = \tilde{u}_j \tilde{u}_j' = \begin{bmatrix} \tilde{u}_{j1} \tilde{u}_{j1} & \ldots & \tilde{u}_{j1} \tilde{u}_{jN} \\ \vdots & \ddots & \vdots \\ \tilde{u}_{jN} \tilde{u}_{j1} & \ldots & \tilde{u}_{jN} \tilde{u}_{jN} \end{bmatrix}$$

where $\tilde{u}_1$ is the estimated singular vector of the jth singular vector $\tilde{u}_j$. $\tilde{u}$ is an Nx1 vector expressed as:

$$\tilde{u}_j = \begin{bmatrix} \tilde{u}_{j1} \\ \vdots \\ \tilde{u}_{jN} \end{bmatrix}.$$

Initially, $\tilde{u}_j$ can be set as a vector with random entry values (in other words, $\tilde{u}_{j1}, \ldots \tilde{u}_{jN}$) can be random values. The goal is to determine through multiple iteration cycles a $\tilde{u}_j$ that converges the jth singular vector $u_j$.

The estimated Frobenius product is:

$$A \times_F \tilde{\mathbb{U}}_j = \begin{bmatrix} a_{11} & \ldots & a_{1N} \\ \vdots & \ddots & \vdots \\ a_{1N} & \ldots & a_{NN} \end{bmatrix} \times_F \begin{bmatrix} \tilde{u}_{j1} \tilde{u}_{j1} & \ldots & \tilde{u}_{j1} \tilde{u}_{jN} \\ \vdots & \ddots & \vdots \\ \tilde{u}_{jN} \tilde{u}_{j1} & \ldots & \tilde{u}_{jN} \tilde{u}_{jN} \end{bmatrix} =$$

$$\sum_{n=1}^{N} \sum_{m=1}^{N} \begin{bmatrix} a_{11} \tilde{u}_{j1} \tilde{u}_{j1} & \ldots & a_{1N} \tilde{u}_{j1} \tilde{u}_{jN} \\ \vdots & \ddots & \vdots \\ a_{1N} \tilde{u}_{jN} \tilde{u}_{j1} & \ldots & a_{NN} \tilde{u}_{jN} \tilde{u}_{jN} \end{bmatrix} =$$

$$a_{11} \tilde{u}_{j1}^2 + \ldots + a_{NN} \tilde{u}_{jN}^2 + 2a_{12} \tilde{u}_{j1} \tilde{u}_{j2} + 2a_{13} \tilde{u}_{j1} \tilde{u}_{j3} + \ldots + 2a_{1N} \tilde{u}_{j1} \tilde{u}_{jN} + 2a_{23} \tilde{u}_{j2} \tilde{u}_{j3} + \ldots + 2a_{2N} \tilde{u}_{j2} \tilde{u}_{jN} + \ldots$$

Further, for a matrix A that is SPD or Symmetric Positive Semi-definite (SPSD), the trace or sum of diagonal elements is also the sum of the singular values (or equivalently, eigenvalues) and is expressed as:

$$X = \text{Trace}(A) = \sum_{j=1}^{N} a_{jj} = \sum_{j=1}^{N} \sigma_j$$

where X>0.

The following positive objective function is constructed and to be minimized:

$$\Omega_1 = X - A \times_F \tilde{\mathbb{U}}_1 = \sum_{j=1}^{N} \sigma_j - A \times_F \tilde{\mathbb{U}}_1 =$$

$$\sum_{j=1}^{N} \sigma_j - (a_{11} \tilde{u}_{11}^2 + \ldots + a_{NN} \tilde{u}_{1N}^2 + 2a_{12} \tilde{u}_{11} \tilde{u}_{12} + 2a_{13} \tilde{u}_{11} \tilde{u}_{j3} + \ldots + 2a_{1N} \tilde{u}_{11} \tilde{u}_{1N} + 2a_{23} \tilde{u}_{12} \tilde{u}_{13} + \ldots + 2a_{2N} \tilde{u}_{12} \tilde{u}_{1N} + \ldots)$$

If the estimations were perfect and each $\tilde{u}_j$ matched $u_j$ perfectly, convergence would be reached. The goal is to choose the optimal values for $\tilde{\mathbb{U}}_1 = \tilde{u}_1 \tilde{u}_1'$ so that the maximum amount of minimization of $\Omega_1$ is achieved. Generally, convergence is considered to have been reached when the difference between $\tilde{u}_j$ and $u_j$ are within a threshold amount.

Given that $\tilde{\mathbb{U}}_1$ is only rank-1 and A is rank-N (or rank M<N but not rank-1), whatever values that re picked for $\tilde{\mathbb{U}}_1$ will either not reduce the rank of A or reduce the rank by only 1 if we compute a matrix $$A_2 = A - \xi \tilde{\mathbb{U}}_1$$

where $\xi$ is a weighting function. And if $\xi = \sigma_1$ and $\tilde{\mathbb{U}}_1 = \mathbb{U}_1 = u_1 u_1'$ then $$A_2 = A - \sigma_1 \mathbb{U}_1 = A - \sigma_1 u_1 u_1'$$

is of rank 1 less than the rank of A, and $$\text{Trace}(A_2) = \sum_{j=2}^{N} \sigma_j$$

which means the largest singular value has been removed from the trace, and $\Omega_1$ in the equation above has been optimally minimized, and that there is no vector other than the first singular vector $u_1$ that can achieve this result. The estimation can be repeated on $A_2$, $A_3$, etc.

To prevent the iteration results from going to infinity, another constraint for the objective function $\Omega_1$ is added where the choice of $u_1$ is forced to be normalized, i.e. $\|u_1\| = 1$. This means that $$u_1' u_1 = \sum_{j=1}^{N} u_{1j}^2 = 1$$

which means a Lagrange multiplier aspect can be added to the objective function to be minimized. In other words, $$\Omega_1 = \sum_{j=1}^{N} \sigma_j - (a_{11} \tilde{u}_{11}^2 + \ldots + a_{NN} \tilde{u}_{1N}^2 + 2a_{12} \tilde{u}_{11} \tilde{u}_{12} + 2a_{13} \tilde{u}_{11} \tilde{u}_{j3} + \ldots +$$

-continued $$2a_{1N}\tilde{u}_{11}\tilde{u}_{1N} + 2a_{23}\tilde{u}_{12}\tilde{u}_{13} + \ldots + 2a_{2N}\tilde{u}_{12}\tilde{u}_{1N} + \ldots) + \lambda\left(1 - \sum_{j=1}^{N} u_{jj}^2\right)$$

Taking derivative with respect to $\tilde{u}_{jk}$'s leads to the following:

$$\frac{\partial \Omega_1}{\partial \tilde{u}_{11}} = 2a_{11}\tilde{u}_{11} + 2a_{12}\tilde{u}_{12} + \ldots + 2a_{1N}\tilde{u}_{1N} - 2\lambda\tilde{u}_{11} = 0$$

$$\frac{\partial \Omega_1}{\partial \tilde{u}_{12}} = 2a_{12}\tilde{u}_{11} + 2a_{22}\tilde{u}_{12} + \ldots + 2a_{2N}\tilde{u}_{1N} - 2\lambda\tilde{u}_{12} = 0$$

$$\vdots$$

$$\frac{\partial \Omega_1}{\partial \tilde{u}_{1N}} = 2a_{1N}\tilde{u}_{11} + 2a_{2N}\tilde{u}_{12} + \ldots + 2a_{NN}\tilde{u}_{1N} - 2\lambda\tilde{u}_{1N} = 0$$

which leads to $$\begin{bmatrix} a_{11} & \ldots & a_{1N} \\ \vdots & \ddots & \vdots \\ a_{1N} & \ldots & a_{NN} \end{bmatrix} \begin{bmatrix} \tilde{u}_{11} \\ \vdots \\ \tilde{u}_{1N} \end{bmatrix} - \lambda \begin{bmatrix} 1 & \ldots & 0 \\ \vdots & \ddots & \vdots \\ 0 & \ldots & 1 \end{bmatrix} \begin{bmatrix} \tilde{u}_{11} \\ \vdots \\ \tilde{u}_{1N} \end{bmatrix} = 0$$

which can be written as $$\begin{bmatrix} a_{11}-\lambda & \ldots & a_{1N} \\ \vdots & \ddots & \vdots \\ a_{1N} & \ldots & a_{NN}-\lambda \end{bmatrix} \begin{bmatrix} \tilde{u}_{11} \\ \vdots \\ \tilde{u}_{1N} \end{bmatrix} = 0$$

which is interpreted as follows: $\lambda$ is subtracted from the diagonal of a PDF and then this new matrix is orthogonal to $$\begin{bmatrix} \tilde{u}_{11} \\ \vdots \\ \tilde{u}_{1N} \end{bmatrix}$$

means that $\lambda$ is an eigenvalue and the matrix after subtraction is singular, which means it has lost one vector from its set of vectors that constitute the Range of A and such a vector constitutes an eigenvector, and thus $A-\lambda I$ is rank 1 lower than A, and it has the vector that A lost as part the Range as part of the Null space of $A-\lambda I$ which is why this matrix-vector product is equal to zero.

Another way to look at it is:

$$\begin{bmatrix} a_{11} & \ldots & a_{1N} \\ \vdots & \ddots & \vdots \\ a_{1N} & \ldots & a_{NN} \end{bmatrix} \begin{bmatrix} \tilde{u}_{11} \\ \vdots \\ \tilde{u}_{1N} \end{bmatrix} = \lambda \begin{bmatrix} \tilde{u}_{11} \\ \vdots \\ \tilde{u}_{1N} \end{bmatrix}$$

which is the regular eigenvalue-eigenvector relationship equation.

The equations above lead to a process that includes an update to the eigenvector, and a re-normalization of the eigenvector. An iterative evaluation of the convergence error is optionally implemented. After an iteration cycle, a singular value and a principal vector (or an eigenvalue and an eigenvector in the case of a SPD matrix) are generated. In one embodiment, a deflation step $A_1 = A - \sigma_1 \tilde{u}_1 \acute{u}_1'$ is performed in order to strip the matrix A of those newly computed values so that the next iteration cycle computes the next largest eigenvalue and its corresponding principal vector of the newly rank-reduced matrix $A_1$. However, the deflation requires computing an outer product $\tilde{u}_1 \tilde{u}_1'$ which generates an N×N matrix (meaning we have $N^2$ multiplies) and then a matrix-matrix subtraction. It also means that in the case where A is sparse, and sparse matrix-vector multiplication techniques are being used, the resulting eigenvector $\tilde{u}_1$ and therefore $\tilde{u}_1'$ are not necessarily sparse, which means that $A_1$ is not sparse and this can lead to loss in computational efficiency after only one iteration cycle of the process.

In another embodiment, deflation is omitted, and instead the technique uses the projection of the eigenvector under computation on the previously found eigenvectors and then a subtraction of the projection from the computation. This leaves the main matrix-vector operation intact, meaning the original sparse matrix A is still used in subsequent steps of the process and not the updated deflated matrices $A_1, A_2$, etc. Sparse matrices have certain advantages in terms of computational efficiency. For example, operations with sparse matrices do not require unnecessary low-level arithmetic such as zero-adds. Further, sparse matrices can be compressed using standard compression techniques, thus requiring less memory than a non-sparse matrix of the same size. By preserving the sparse nature of the matrix throughout the process, the computational advantages are preserved.

The basic motivation behind the adaptive processes is that the initial eigenvector is random, and the error signal is generated $$\varepsilon = \frac{\text{Trace}(A_j) - \sum_{n=1}^{N}\sum_{m=1}^{N}(A_j \otimes \tilde{u}_j \tilde{u}_j')}{\text{Frobenius Norm of } A_j \otimes \tilde{u}_j \tilde{u}_j'}$$

The adaptation uses the elements of $A_j$ that multiplied the elements of $\tilde{u}_j\tilde{u}_j'$ to update the elements of $\tilde{u}_j$ in such a way that minimizes the error, and such a way is obtained by differentiating $\varepsilon$ with respect to $\tilde{u}_j$.

Figure 3:
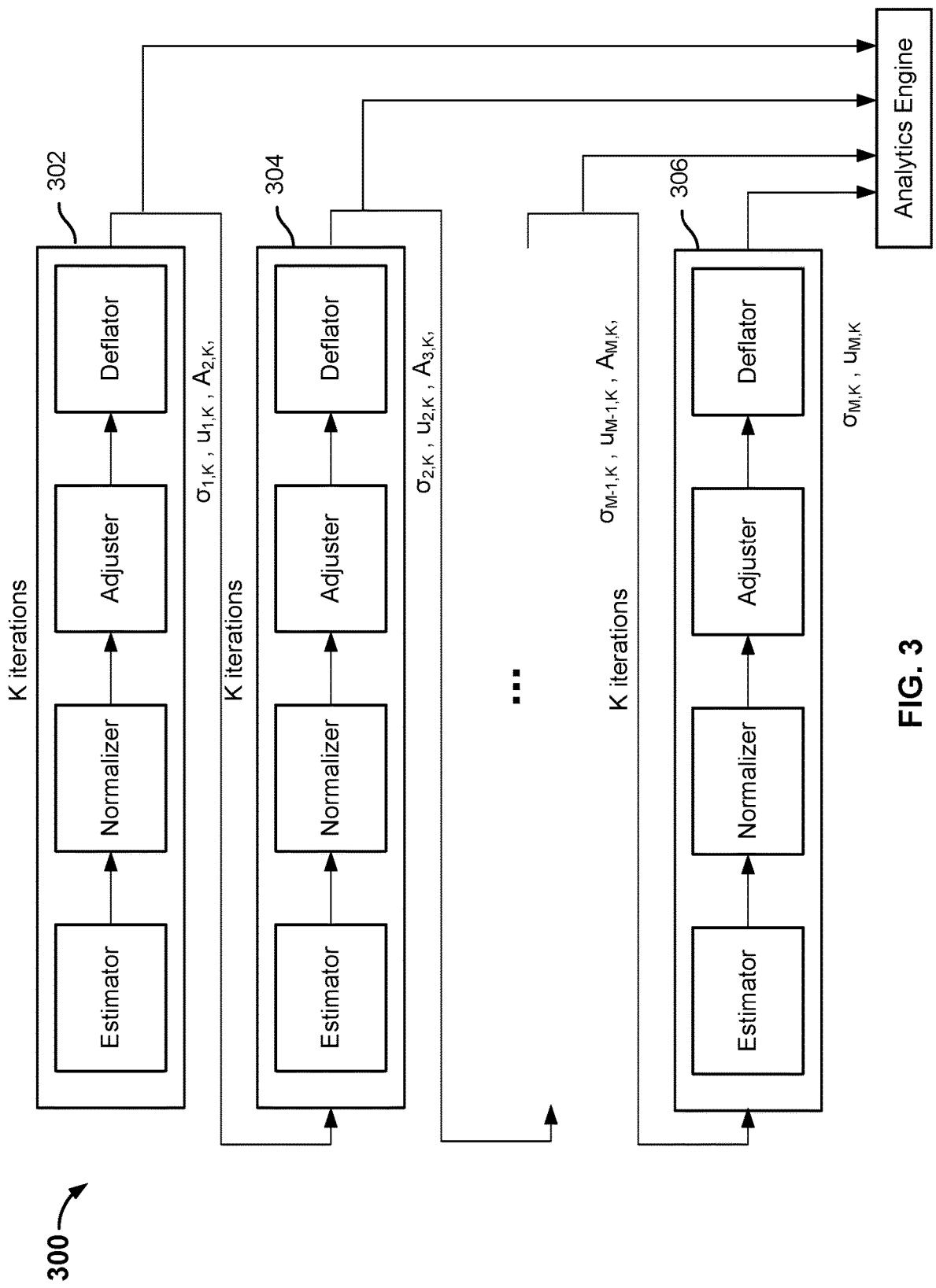
FIG. 3 is a block diagram illustrating an embodiment of a pipelined system configured to perform a SVD of a matrix.

FIG. 3 is a block diagram illustrating an embodiment of a pipelined system configured to perform a SVD of a matrix.

The example system 300 comprises a plurality of stages 302, 304, 306, etc., and is configured to implement a process such as 500. There are M stages (for j=1:M), where the value of M depends on implementation. For example, M can be set to the desired number of singular vectors with the highest values. As shown, each stage comprises certain sub-stages such as a an estimator configured to estimate a singular vector, a normalizer configured to normalize the output of the estimator, an adjuster configured to compute a singular value, and a deflator configured to deflate (i.e., reduce the rank) of the matrix being processed. For systems implementing other embodiments of processes for performing SVD, different sub-stages can be used (for example, the deflator may not be required). Details of the sub-stages and their corresponding processes are described in greater detail below.

At the j-th stage, the computations are iterated K times within this stage to generate a set of outputs, in this case the singular value $\sigma_j$, the corresponding estimated singular vector $\tilde{u}_j$, and a deflated matrix $A_{j+1}$. The outputs are sent to the next stage to be used in determining the next set of outputs. At the end, $\sigma_j$ and/or $\tilde{u}_j$ are sent to an analytics engine (such as a search application, a clustering application, a de-noising application, a compression application, etc.), to a storage, to a display, or the like.

Note that in this system, the iterative stages are shown to perform sequentially. In other words, the $\sigma_j$, $\tilde{u}_j$, and $A_{j+1}$ are computed after K iteration cycles of computation at the j-th sub-stage, and sent to the (j+1)-th stage as basis for computing the next set of $\sigma_{j+1}$, $\tilde{u}_{j+1}$, and $A_{j+2}$. Thus, the outputs are labeled as $\sigma_{j,K}$, $\tilde{u}_{j,K}$, and $A_{j+1,K}$ to indicate the number of iteration cycles performed at each stage for achieving the outputs.

Figure 4:
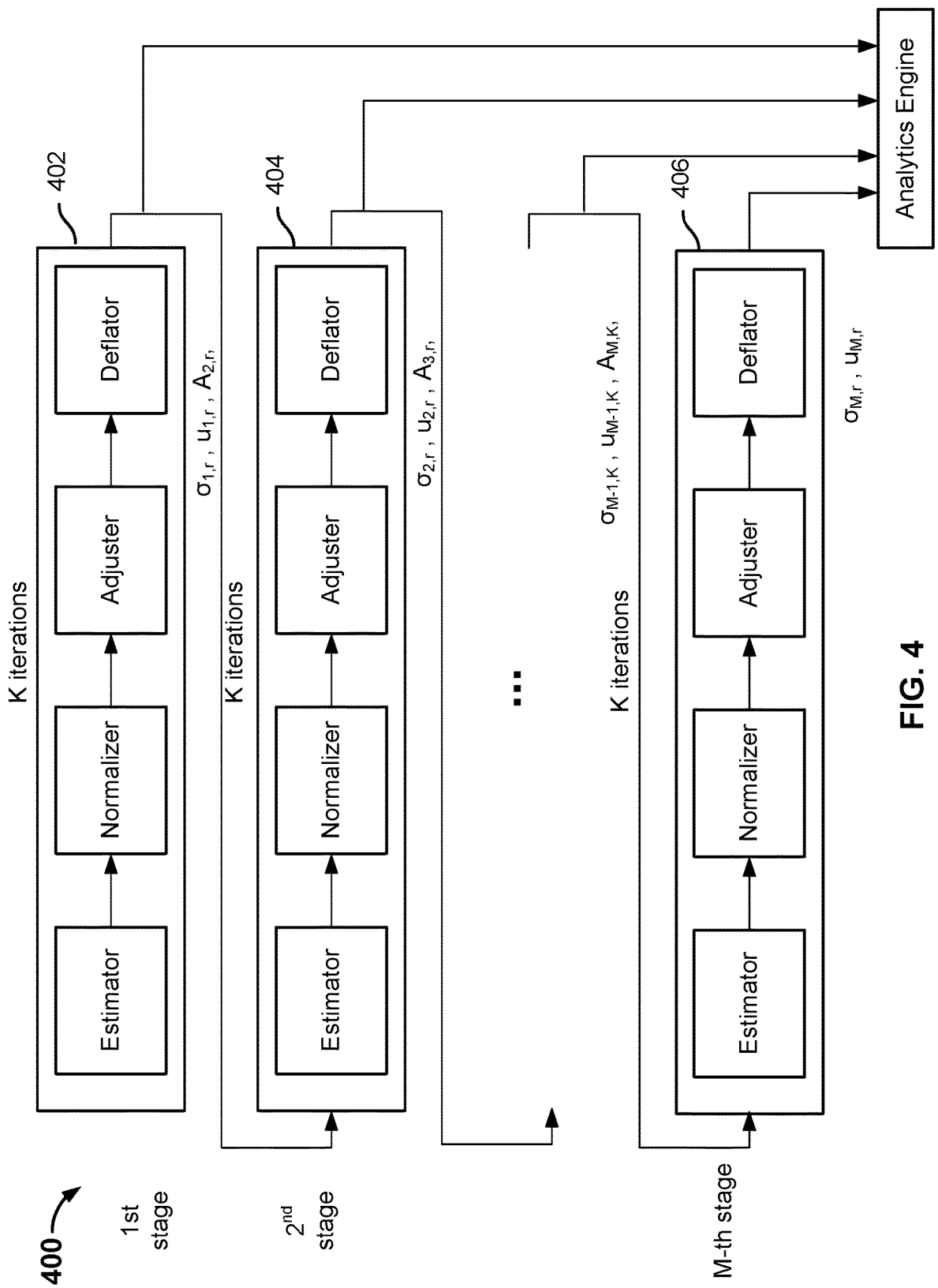
FIG. 4 is a block diagram illustrating another embodiment of a pipelined, parallelized system configured to perform a SVD of a matrix.

FIG. 4 is a block diagram illustrating another embodiment of a pipelined, parallelized system configured to perform a SVD of a matrix. System 400 is similar to 300 but allows for parallel processing. In this example, each stage 402, 404, 406, etc., can be implemented on a separate processor or a separate set of processors. At the j-th stage, after r iteration cycles are completed (where r is a value less than K), the interim values for $\sigma_{j,r}$, $\tilde{u}_{j,r}$, and $A_{j+1,r}$ are output to the next stage such that the (j+1)-th stage can commence its iteration cycle. For example, suppose K=50 and r=4, then at the 4-th iteration cycle, $\sigma_{j,4}$, $\tilde{u}_{j,4}$, and $A_{j+1,4}$ are output to the next stage. Although these interim values will not necessarily have converged, they are good starting points for the next stage to start estimations. Meanwhile, the j-th stage will continue to carry out its iteration cycles until all 50 iteration cycles are completed or the computed values are deemed to have converged (e.g., when the difference of the singular value between iteration cycles has fallen below a threshold). Because the (j+1)-th stage does not need to wait for the j-th stage to complete full 50 iteration cycles before starting its own iteration cycles, the computations across all M computational stages can be carried out substantially in parallel on multiple processors, thus greatly speeding up the computations.

Conventional techniques often compute singular values first, then derive singular vectors based on the singular values. In both systems 300 and 400, however, singular values $\sigma_j$ and singular vectors $\tilde{u}_j$ are generated simultaneously, without having to derive one from the other.

The architectures shown in FIGS. 300 and 400 are regular iterative pipelines. Because the elements in each stage behaves in a predictable, pipelined fashion without relying on checking previous results and branching, in some embodiments, special hardware is used to implement the stages to speed up computation. For example, in the estimator block where a matrix is multiplied with a vector (e.g., the estimated singular vector), parallel multipliers can be implemented to multiply the rows of the matrix with the vector in parallel because there is no dependency between the rows.

Figure 5:
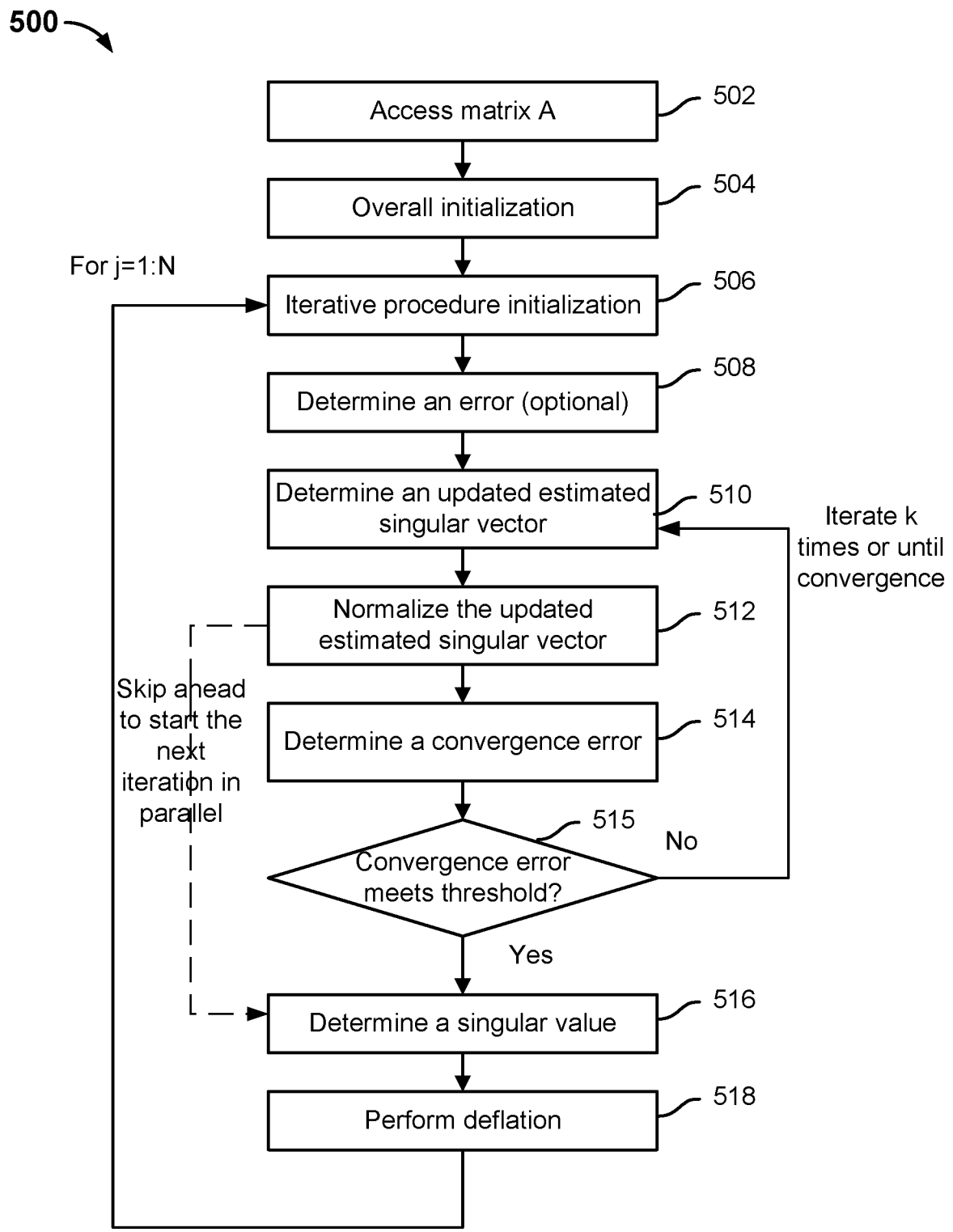
FIG. 5 is a flowchart illustrating an embodiment of an iterative process for performing a SVD for an example matrix.

FIG. 5 is a flowchart illustrating an embodiment of an iterative process for performing a SVD for an example matrix.

Process 500 can be performed on a system such as 100, 300, or 400, and is preferably used to process a non-sparse matrix. As used herein, a sparse matrix refers to a matrix that has many entries that are zero, and a non-sparse matrix is the opposite. Whether a matrix is sparse or non-sparse can be implementation specific. In some embodiments, a matrix that includes at least a threshold number of percentage of zero-entries is deemed to be sparse. For purposes of this example, it is assumed that whether the matrix is sparse is pre-specified.

At 502, a matrix A is accessed. In this example, matrix A is an SPD matrix that is full rank and has non-zero singular values. The technique is also applicable to symmetric positive semidefinite (SPSD) matrices that is not full rank and has one or more singular values that are 0.

At 504, initialization of the overall process takes place. The initial matrix $A_0$ is set to matrix A. The index of the singular vector, j, is set to 0. Further, a step size for iteration is obtained. In this example, the step size is chosen as a small positive number, such as a value between 0.02-0.05. Different values can be used in other embodiments.

The iterative steps 506-518 are performed N times (for j=1, 2, ... N) to determine singular values $\sigma_1, \sigma_2, \ldots, \sigma_N$.

At 506, during initialization of the iterative procedure to determine a singular value, j is incremented, and the current matrix $A_j$ is set to the previous matrix $A_{j-1}$. The estimated singular vector $\tilde{u}_j$ is initialized with random numbers generated using, for example, a Gaussian or uniform probability distribution function.

For a given j, iterative steps 508-515 are performed K times or until convergence is reached for the singular vector $u_j$. The value of K is configurable and can vary for different embodiments. K can be chosen based on test runs of sample data to ensure that convergence can be achieved. In some embodiments, a K value between 50-100 is used.

At 508, an error is optionally determined. The error is expressed as:

$$\varepsilon = \text{Trace}(A_j) - \underbrace{\sum_{n=1}^{N}\sum_{m=1}^{N}(A_j \otimes \tilde{u}_j\tilde{u}_j')}_{\text{Frobenius Norm of } A_j \otimes \tilde{u}_j\tilde{u}_j'}$$

where the matrix $A_j \otimes \tilde{u}_j\tilde{u}_j'$ is element-by-element product of $A_1$ and $\tilde{u}_j\tilde{u}_j'$.

The computation of the error is not required for achieving convergence but is helpful for monitoring the convergence. In particular, the error indicates the overall accuracy of the singular values computed.

At 510, an updated estimated singular vector $\tilde{w}_j$ is computed based at least in part on the estimated singular vector, the step size, and the current matrix, as follows:

$$\tilde{w}_j = \tilde{u}_j + \mu/A_j\tilde{u}_j \tag{9}$$

Note that in some embodiments, $A_j\tilde{u}_j$ is implemented using special hardware that performs the multiplications of rows of $A_j$ with $\tilde{u}_j$ in parallel.

At 512, the updated estimated singular vector $\tilde{w}_j$ is normalized to generate the normalized updated estimated singular vector $\tilde{u}_j$ as follows:

$$\tilde{u}_j = \tilde{w}_j / |\tilde{w}_j|$$

where $|\tilde{w}_j|$ is the magnitude of $\tilde{w}_j$.

At 514, the convergence error is determined. The convergence error is used to determine when a particular singular vector has converged and iteration can be stopped. In this example, the convergence error does not drive the iteration cycles (in other words, the convergence error from one iteration cycle is not needed for computing the singular value/vector in the next iteration cycle).

In some embodiments, the convergence error is determined as the L2-norm of the estimated singular vector between two consecutive iteration cycles as follows:

$$e = \|\tilde{u}_j|_k - \tilde{u}_j|_{k-1}\|$$

In some embodiments, to simplify computation and avoid multiplication operations, the convergence error is determined as the L1-norm of the estimated singular vector between two consecutive iteration cycles as follows:

$$e = |\tilde{u}_j|_k - \tilde{u}_j|_{k-1}|$$

At 515, the convergence error is compared with a pre-specified error threshold. If the convergence error meets (e.g., is less than or equal to) the threshold, the iterative process has converged and the process proceeds to 516. Otherwise, the process continues to 510 to begin the next iteration cycle, until K iteration cycles or convergence is achieved. In this example, it is assumed that after K iteration cycles, the results are adequately close to convergence. In some embodiments, it is optionally checked whether the process has achieved convergence after K iteration cycles. If not, the process can optionally terminate or retry (with different K and/or initialized values). The convergence error is optional, and is not required for achieving convergence since even without checking for the convergence error, the process will still converge after K iteration cycles. Therefore, the process is said to be non-error driven.

Once the iterative process has converged or K iteration cycles have been carried out, at 516, the singular value $\sigma_j$ is determined.

In some embodiments, the singular value is determined based on the norm of the updated estimated singular vector $\tilde{w}_j$ and the norm of normalized updated estimated singular vector $\tilde{u}_j$ as follows:

$$\sigma_j = \|\tilde{w}_j\| / \|\tilde{u}_j\|$$

In some embodiments, to avoid computing the norms, the singular value is determined using a ratio of any two corresponding non-zero elements as follows:

$$\sigma_j = \tilde{w}_j(m) / \tilde{u}_j(m)$$

At 518, deflation is performed on the current matrix to generate a deflated matrix to be used in the next iteration cycle, as follows:

$$A_j = A_j - \sigma_j \tilde{u}_j \tilde{u}_j'$$

Deflation reduces the rank of matrix $A_j$ by 1. In the next iteration cycle, a matrix with a reduced rank is used and computation is simplified. After deflation, the j-th iteration cycle completes. The process returns to 506 for the next iteration cycle, until N iteration cycles have been carried out and all N singular values have been determined.

The above process computes all N singular values for an N×N matrix. Alternatively, the iterative steps can be performed M times (where M<N) to determine the top M singular values $\sigma_1, \sigma_2, \ldots, \sigma_M$.

To parallelize the process, at a given stage j, after r number of iteration cycles of the 510-515 loop (r<K), the process proceeds from 512 to 516 to provide an interim matrix $A_j$ for the next stage j+1. While the next iteration cycle j+1 is in progress, the current iteration cycle j continues (until K iteration cycles of the 510-515 loop are completed or convergence is achieved). In this manner, each stage can skip ahead to supply interim outputs to the next stage rather than waiting for convergence or for all K iteration cycles in the current stage to complete. Thus, the computations can be carried out on multiple processors in a substantially parallel manner and processing speed is greatly improved.

Figure 6:
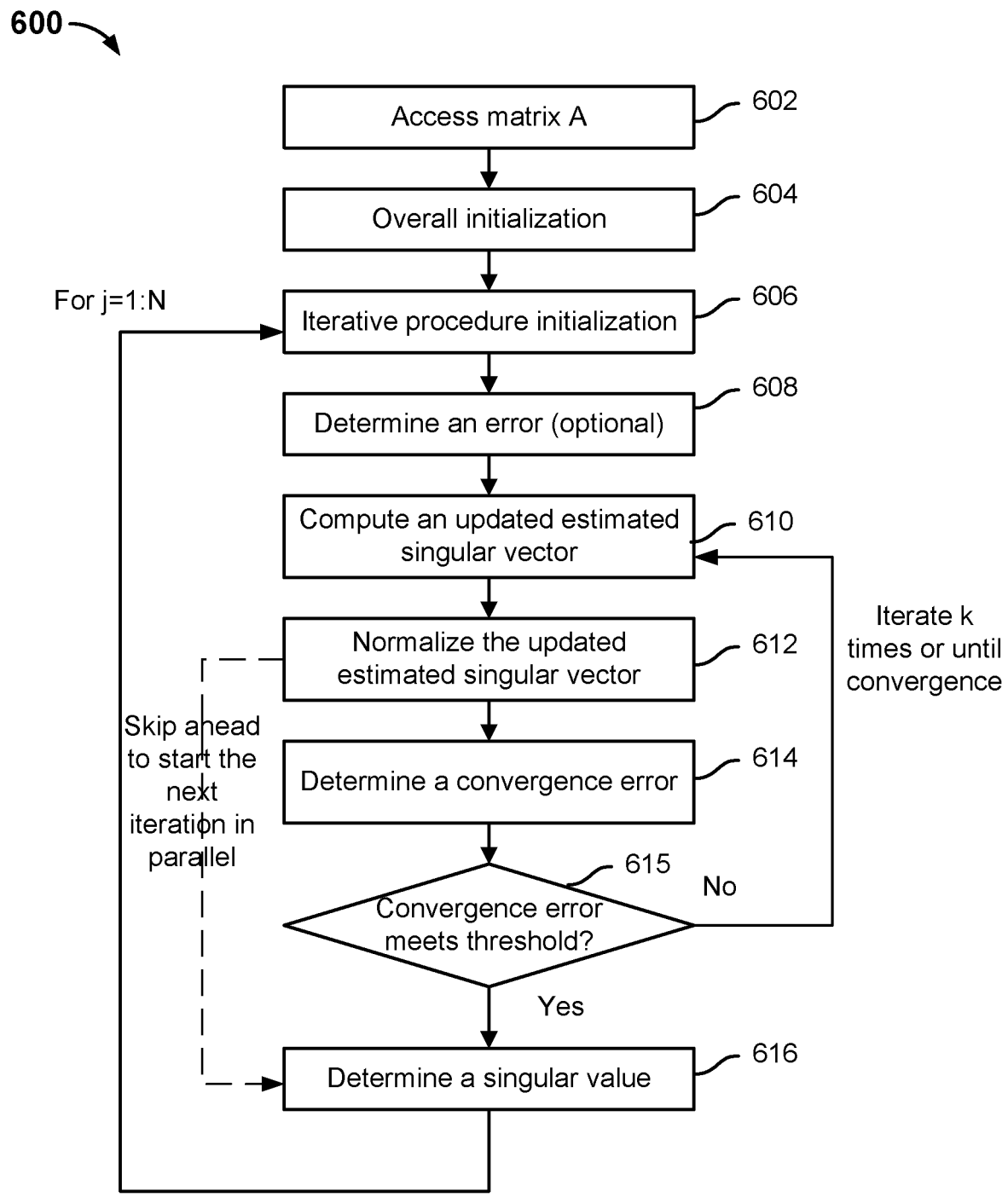
FIG. 6 is a flowchart illustrating another embodiment of a process for performing a SVD for a symmetric positive definite (SPD) matrix.

FIG. 6 is a flowchart illustrating another embodiment of a process for performing a SVD for a symmetric positive definite (SPD) matrix.

Process 600 can be performed a system similar to 100, 300, or 400, and is preferably used to process a sparse matrix. For purposes of this example, it is assumed that whether the matrix is sparse/non-sparse is pre-specified. Process 600 is similar to 500 but does not require the deflation step, thus preserving the sparse nature of the matrix during iteration cycles and the associated computational efficiencies.

At 602, a matrix A is accessed.

At 604, initialization of the overall process takes place. The initial matrix $A_0$ is set to matrix A. The index of the singular vector, j, is set to 0. $\alpha_0$ and $\tilde{u}_0$ are set to 0. Further, a step size for iteration is obtained. In this example, the step size is chosen as a small positive number, such as a value between 0.02-0.05. Different values can be used in other embodiments.

The iterative steps 606-616 are performed N times (for j=1, 2, . . . N) to determine A's singular values $\sigma_1, \sigma_2, \ldots, \sigma_N$.

At 606, during initialization of the iterative procedure to determine a singular value, j is incremented, and the estimated singular vector $\tilde{u}_j$ is initialized with random numbers generated using, for example, a Gaussian or uniform probability distribution function.

At 608, an error is optionally determined. The error is expressed as:

$$\varepsilon = \frac{\text{Trace}(A) - \sum_{p=0}^{j-1} \sigma_p - \sum_{n=1}^{N}\sum_{m=1}^{N}(A \otimes \tilde{u}_j \tilde{u}_j')}{\text{Frobenius Norm of } A \otimes \tilde{u}_j \tilde{u}_j'}$$

where the matrix $A_1 \otimes \tilde{u}_j \tilde{u}_j'$ is element-by-element product of $A_1$ and $\tilde{u}_j \tilde{u}_j'$ and $$\sum_{p=0}^{j-1} \sigma_p$$

is the sum of the previously computed singular values, with $\sigma_0 = 0$. Similar to the error computed in 508 of process 500, the error computed here is not required for convergence but is optionally used for monitoring convergence.

For a given j, iterative steps 610-615 are performed K times or until convergence is reached for the singular vector $u_j$. As discussed in process 500, K is configurable.

At 610, an updated estimated singular vector $\tilde{w}_j$ is computed based at least in part on the estimated singular vectors (e.g., current estimated singular vector $\tilde{u}_j$ and previous estimated singular vectors $\tilde{u}_{j-p}$), the step size $\mu$, and the original matrix, as follows:

$$\tilde{w}_j = \tilde{u}_j + \mu A \left\{ \tilde{u}_j - \sum_{p=1}^{j} (\tilde{u}'_j \tilde{u}_{j-p}) \tilde{u}_{j-p} \right\}$$

where $\tilde{u}_{j-p}=0$ for $p=1$ and the term $$\left\{ \tilde{u}_j - \sum_{p=1}^{j-1} (\tilde{u}'_j \tilde{u}_{j-p}) \tilde{u}_{j-p} \right\}$$

removes the effect of all previously computed eigenvectors from the convergence of the computation of the current eigenvector. Note that $$\sum_{p=1}^{j-1} (\tilde{u}'_j \tilde{u}_{j-p}) \tilde{u}_{j-p}$$

is the sum of the projections of $\tilde{u}_j$ on all previously computed eigenvectors. The advantage of this approach is that it involves inner vector products and subtraction and does not require outer product computation. Further, the iteration cycles remain a function of A rather than $A_j$, which means in the case A is sparse, the matrix used in computation will not become compacted after the initial iteration cycle, thus allowing the process to take advantage of the sparse property of the matrix for computations throughout the iteration cycles. In some embodiments, rows of the original matrix are multiplied with the estimated singular vector in parallel to improve performance.

At 612, the updated estimated singular vector $\tilde{w}_j$ is normalized to generate the normalized updated estimated singular vector $\tilde{u}_j$ as follows:

$$\tilde{u}_j = \tilde{w}_j / |\tilde{w}_j|$$

At 614, the convergence error is determined.

In some embodiments, the convergence error is determined as the L2-norm of the estimated singular vector between two consecutive iteration cycles as follows:

$$e = \|\tilde{u}_j|_k - \tilde{u}_j|_{k-1}\|$$

In some embodiments, to simplify computation and avoid multiplication operations, the convergence error is determined as the L1-norm of the estimated singular vector between two consecutive iteration cycles as follows:

$$e = |\tilde{u}_j|_k - \tilde{u}_j|_{k-1}|$$

At 615, the convergence error is compared with a pre-specified error threshold. If the convergence error meets (e.g., < or <=) the threshold, the iterative process has converged and the process proceeds to 616. Otherwise, the process returns to 610 to begin the next iteration cycle. The iteration continues until K iteration cycles have been carried out or convergence is reached.

After K iteration cycles have been performed or convergence has been reached, at 616, the singular value $\sigma_j$ is determined.

In some embodiments, the singular value is determined based on the updated estimated singular vector $\tilde{w}_j$ and normalized updated estimated singular vector $\tilde{u}_j$ as follows:

$$\sigma_j = \|\tilde{w}_j\| / \|\tilde{u}_j\|$$

In some embodiments, to avoid computing the norms, the singular value is determined using a ratio of any two corresponding non-zero elements as follows:

$$\sigma_j = \tilde{w}_j(m) / \tilde{u}_j(m)$$

After $\sigma_j$ is computed, the j-th iteration cycle completes. The process returns to 606 for the next iteration cycle, until N iteration cycles have been carried out and all N singular values have been determined.

Similar to process 500, process 600 can be parallelized. At a given stage j, after r number of iteration cycles of the 610-615 loop (r<K), the process proceeds from 612 to 616 to provide an interim previously estimated singular vector $\tilde{u}_{j-p}$ for the next stage j+1. While the next iteration cycle j+1 is in progress, the current iteration cycle j continues (until K iteration cycles of the 610-615 loop are completed or convergence is achieved). Each stage can skip ahead to supply interim outputs to the next stage rather than waiting for convergence or for all K iteration cycles in the current stage to complete. Thus, the computations can be carried out on multiple processors in a substantially parallel manner and processing speed is greatly improved.

Figure 7:
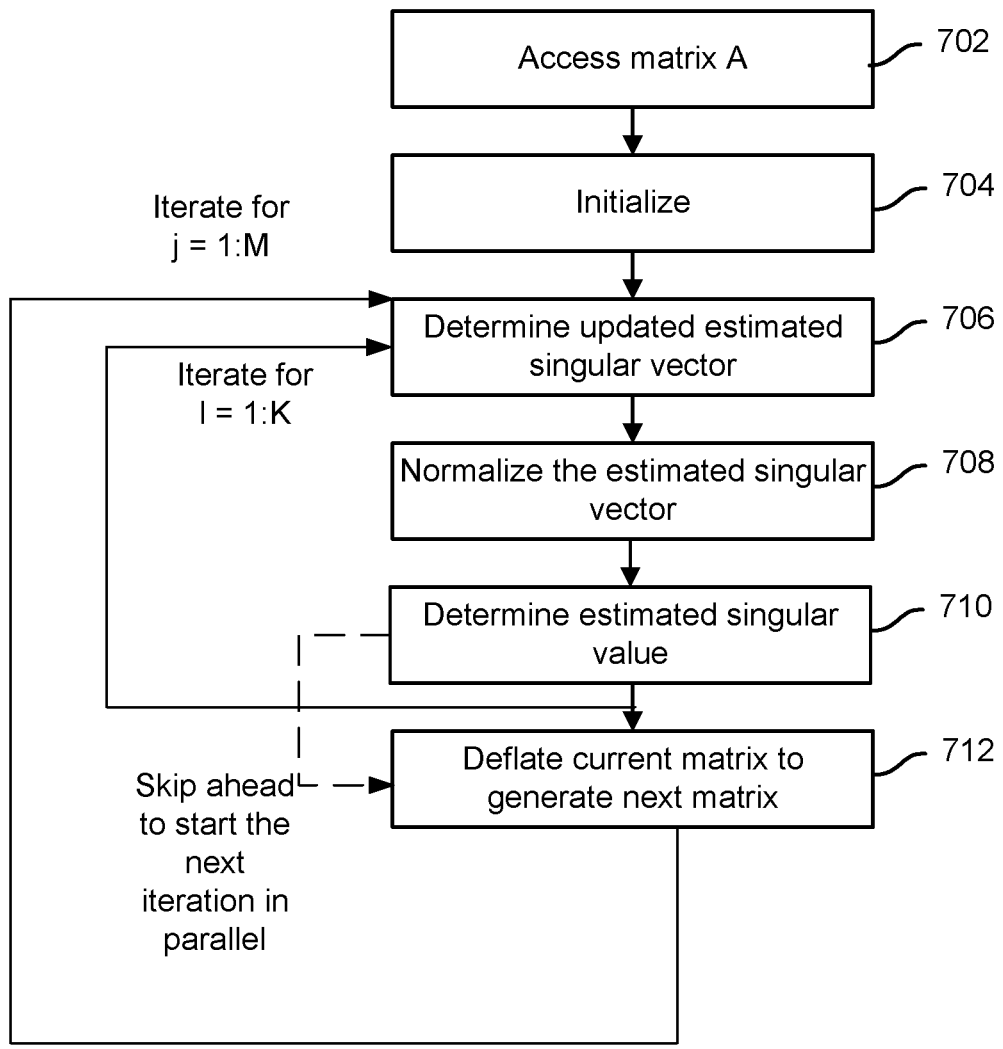
FIG. 7 is a flowchart illustrating another embodiment of a process for performing a SVD for an N×N symmetric matrix.

FIG. 7 is a flowchart illustrating another embodiment of a process for performing a SVD for an N×N symmetric matrix.

Process 700 can be performed a system such as 100, 300, or 400 on any N×N symmetric matrix, whether it is sparse or non-sparse. In this process, iteration cycles and convergence is not dependent on error (in other words, not error-driven). Rather, it is assumed that by iterating the computation K times, convergence will be achieved. Empirically, convergence is usually achieved. In the rare instances that convergence is not achieved (e.g., if the singular vector is still changing substantially from iteration cycle to iteration cycle towards the end of the K computations), the process can be restarted with different initialization values until convergence is achieved.

At 702, a matrix A is accessed. The SVD of the matrix is such that A=UΣU'.

At 704, initialization of the overall process takes place. In this example, the first singular vector $u_1$ is initialized with small random numbers. For example, $u_1$ can be obtained using MATLAB function $u_1$=rand(N,1). Other singular vectors $u_j$ can be similarly initialized.

Further, let current matrix $A_1$=A.

It is assumed that the M most significant singular values and corresponding singular vectors are to be computed, where 1<=M<=N. In this example, M is configurable and can be selected based on the need of the application. Thus, 706-712 are iterated M times (in other words, for j=1:M) to determine singular values $\sigma_j$. Further, for each j, 706-708 are iterated K times (for l=1:K) to determine singular vector $u_j$. As discussed in process 500, K is configurable.

At 706, an updated estimated singular vector $\tilde{u}_j$ is determined by multiplying the original matrix with the current estimated value (the initial value during the first iteration cycle):

$$\tilde{u}_j = A_j u_j$$

This step can be seen as a projection of the estimated singular vector onto the current matrix to obtain an updated estimated singular vector. With each iteration cycle, the projection will bring the estimated singular vector closer to the actual singular vector.

At 708, $\tilde{u}_j$ is normalized to generate an updated, normalized singular vector:

$$u_j = \frac{\tilde{u}_j}{|\tilde{u}_j|}$$

The normalization prevents the estimated singular vector from growing in size with each iteration cycle of 706-710.

After K iteration cycles, at 710, the estimated singular value $\sigma_j$ is computed as the ratio between the magnitude of $\tilde{u}_j$ and the magnitude of $u_j$:

$$\sigma_j = \frac{|\tilde{u}_j|}{|u_j|}$$

When convergence is achieved, $\sigma_j u_j = \tilde{u}_j$

At 712, current matrix $A_j$ is deflated to provide matrix $A_{j+1}$ for the next iteration cycle, as follows:

$$A_{j+1} = A_j - \sigma_j u_j u_j'$$

At convergence, the projection technique used in the iteration will automatically extract the singular vector that has the greatest norm among all the remaining singular vectors, and a corresponding $\sigma_a$ that has the highest energy among all the remaining singular values.

Process returns to 706 until the M most significant singular values ($\sigma_1, \sigma_2, \ldots \sigma_M$) and corresponding singular vectors ($u_1, u_2, \ldots, u_M$) are found.

Process 700 can also be parallelized. At a given stage j, after r number of iteration cycles of the 705-710 loop (r<K), the process proceeds from 710 to 712 to provide an interim matrix $A_{j+1}$ for the next stage j+1. While the next iteration cycle j+1 is in progress, the current iteration cycle j continues (until K iteration cycles of 706-710 are completed). In this manner, each stage can skip ahead to supply interim outputs to the next stage rather than waiting for convergence or for all K iteration cycles in the current stage to complete.

Figure 8:
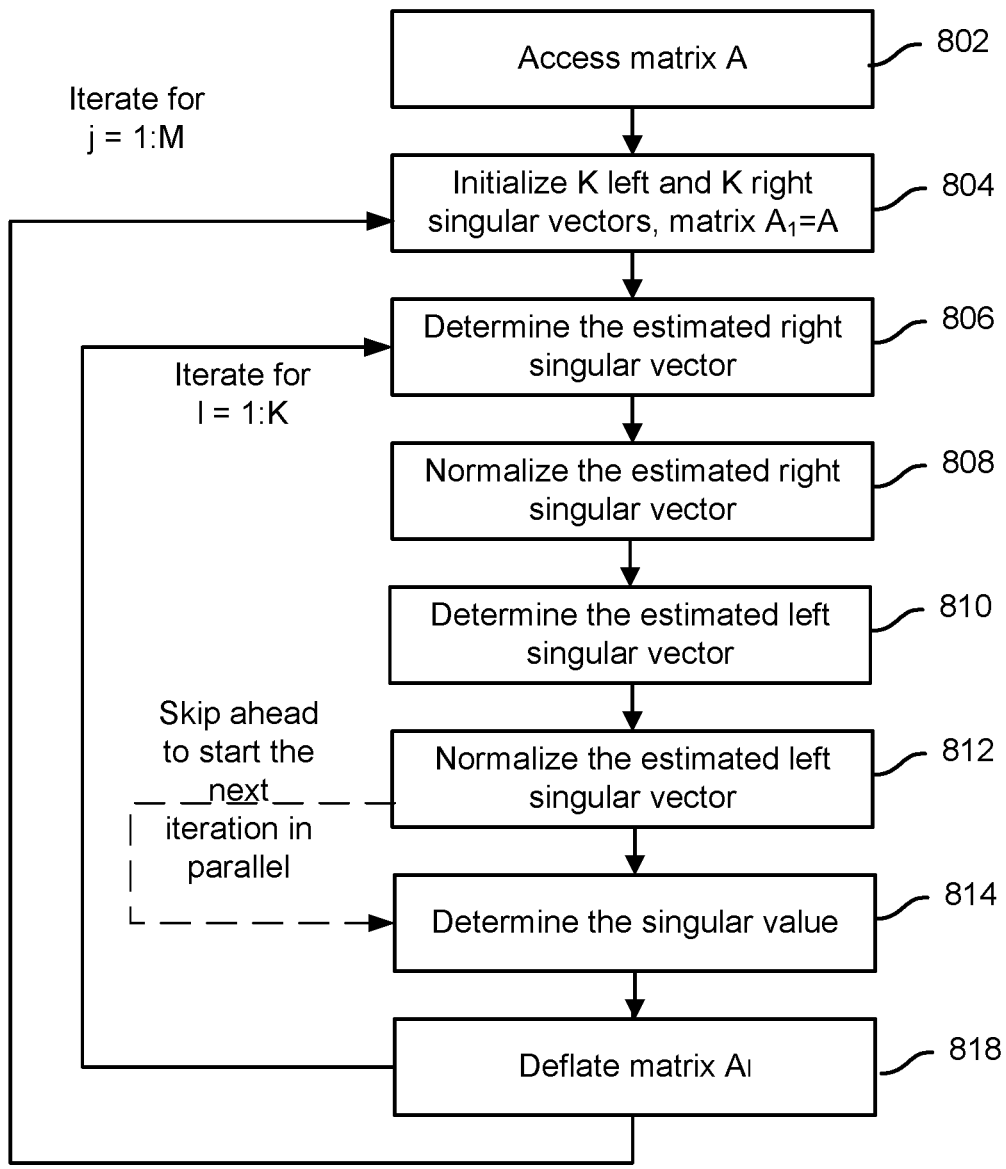
FIG. 8 is a flowchart illustrating another embodiment of a process for performing a SVD for an N×N non-symmetric matrix.

FIG. 8 is a flowchart illustrating another embodiment of a process for performing a SVD for an N×N non-symmetric matrix. Process 800 can be performed a system such as 100, 300, or 400.

Since the principal values of a non-symmetric matrix are not the same as the eigenvalues, the trace of the non-symmetric matrix is no longer a sum of the principal values. Thus, the trace is not used in the computation. During the iterative process, when the matrix is multiplied by the right-side principal vector and the result is normalized, an estimate of the left-side principal vector is obtained. The transpose of the same matrix is then multiplied by the estimate of the left-side principal vector, normalized, and a better estimate of the right side principal vector is obtained, and so on. At each iteration cycle, a better estimate of a left-side or right-side principal vector is obtained.

Process 800 can be performed on any N×N non-symmetric matrix. In this process, convergence is not dependent on error.

At 802, a matrix A is accessed. The SVD of the matrix is such that $A = U\Sigma V'$.

It is assumed that M (M<N) most significant singular vectors/singular values will be determined (for j=1:M), and to determine one set of singular vectors/singular value the computations are iterated K times (for l=1:K). Thus, 804-818 are iterated M times (in other words, for j=1:M). Further, for each j, 806-818 are iterated K times (l=1:K). The values of M and K are configurable and can be set depending on the needs of the application.

At 804, initialization takes place. In this example, the first K left singular vectors $u_1, u_2, \ldots, u_K$ and first K right singular vectors $v_1, v_2, \ldots, v_K$ are initialized with small random numbers. These are the initial guesses for the left or right singular vectors. For example, using Matlab:

$u_l$=rand(N,1) and $v_l$=rand(N,1) for l=1:K.

Further, let current matrix $A_1 = A$.

At 806, an estimated right singular vector $\tilde{u}_l$ is determined by multiplying the current matrix with a corresponding estimated left singular vector $u_l$:

$$\tilde{u}_l = A_l v_l$$

At 808, the estimated right singular vector $\tilde{u}_l$ is normalized to generate an updated, normalized right singular vector $u_l$:

$$u_l = \frac{\tilde{u}_l}{|\tilde{u}_l|}$$

At 810, an estimated left singular vector $\tilde{v}_l$ is determined by multiplying the transpose of the current matrix ($A_l'$) with the updated normalized right singular vector:

$$\tilde{v}_l = A_l' u_l$$

At 812, the estimated left singular vector $\tilde{v}_l$ is normalized to generate an updated, normalized left singular vector $v_l$:

$$v_l = \frac{\tilde{v}_l}{|\tilde{v}_l|}$$

At 814, the singular value $\sigma_l$ is computed as follows:

$$\sigma_l = \frac{|\tilde{u}_l|}{|v_l|}$$

At 816, current matrix $A_l$ is deflated to provide matrix $A_{l+1}$ for the next iteration cycle, as follows:

$$A_{l+1} = A_l - \sigma_l u_l v_l'$$

At which point, process returns to 806 to begin the next iteration cycle and l is incremented, until K iteration cycles are completed, and a singular value and its corresponding left/right singular vectors are computed. The process continues until the most significant M singular values and corresponding left/right singular vectors are determined.

Process 800 can be parallelized. At a given stage j, after r number of iteration cycles of the 806-812 loop (r<K), the process proceeds from 812 to 814 to determine an interim singular value and provide an interim matrix $A_{j+1}$ for the next iteration cycle j+1. While the next iteration cycle j+1 is in progress, the current iteration cycle j continues (until K iteration cycles of 806-812 are completed). In this manner, each stage can skip ahead to supply interim outputs to the next stage rather than waiting for convergence or for all K iteration cycles in the current stage to complete.

Figure 9:
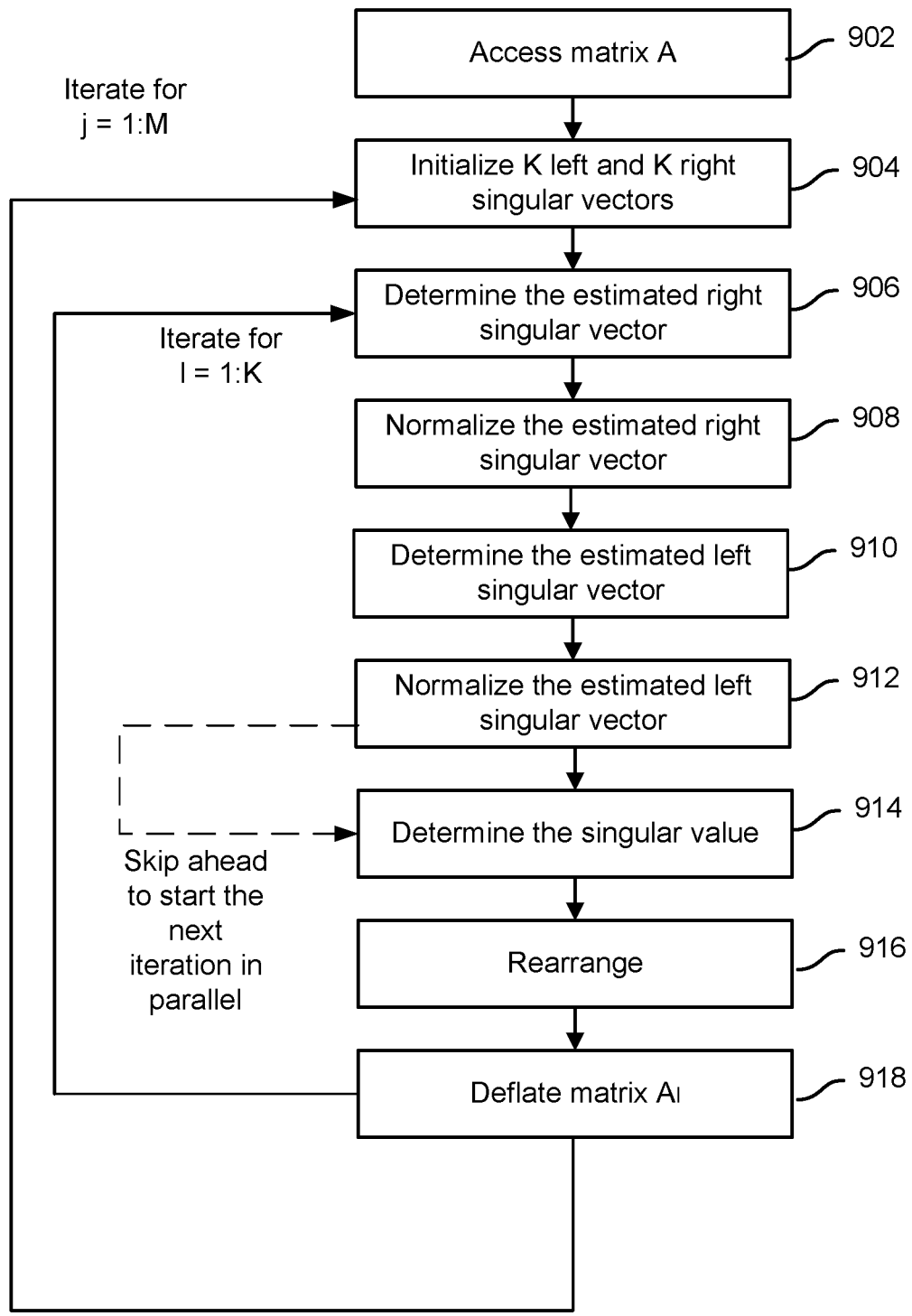
FIG. 9 is a flowchart illustrating another embodiment of a process for performing a SVD for an N×N non-symmetric matrix.

FIG. 9 is a flowchart illustrating another embodiment of a process for performing a SVD for an N×N non-symmetric matrix. Process 900 can be executed on a system such as 100, 300, or 400.

902-914 of process 900 are similar to 802-814 of process 800. After a certain number of iteration cycles, the computed singular values and singular vectors are rearranged at 916 to facilitate convergence. In this example, the computed singular values are sorted, and the indices or positions of the singular values can be rearranged in descending order according to the size of the singular values. Further, the order of the corresponding singular vectors is also sorted in the same way. This way, the deflated matrix to be sent into the next stage of iteration cycle will be based on the rearranged singular vectors and singular values and faster convergence is achieved.

At 918, the matrix is deflated, based at least in part on the resorted singular value and singular vectors. In other words, the matrix used in the next iteration cycle is computed as:

$$A_{j+1} = A_j - \sigma_{j,r} u_{j,r} v_{j,r}'$$

where $\sigma_{j,r}$, $u_{j,r}$, and $v_{j,r}$ are rearranged value/vector at position j.

For example, at j=4, suppose that it is determined that in descending order, the singular values are $\sigma_1$, $\sigma_2$, $\sigma_4$, $\sigma_3$. During deflation, instead of $A_5 = A_4 - \sigma_4 u_4 u_4'$ had the singular values been unsorted, the matrix computed at j=4 for the next iteration cycle stage j=5 is determined as:

$$A_5 = A_4 - \sigma_3 u_3 u_3'$$

Sorting and rearranging the singular values/singular vectors shorten the time for convergence when a smaller singular value/singular vector computation takes place before a larger one in the sequence, which, if left unsorted, can lead to certain converging singular values overtaking each other several times until the order in the iteration cycle is consistent with the descending order of singular values.

Figure 10:
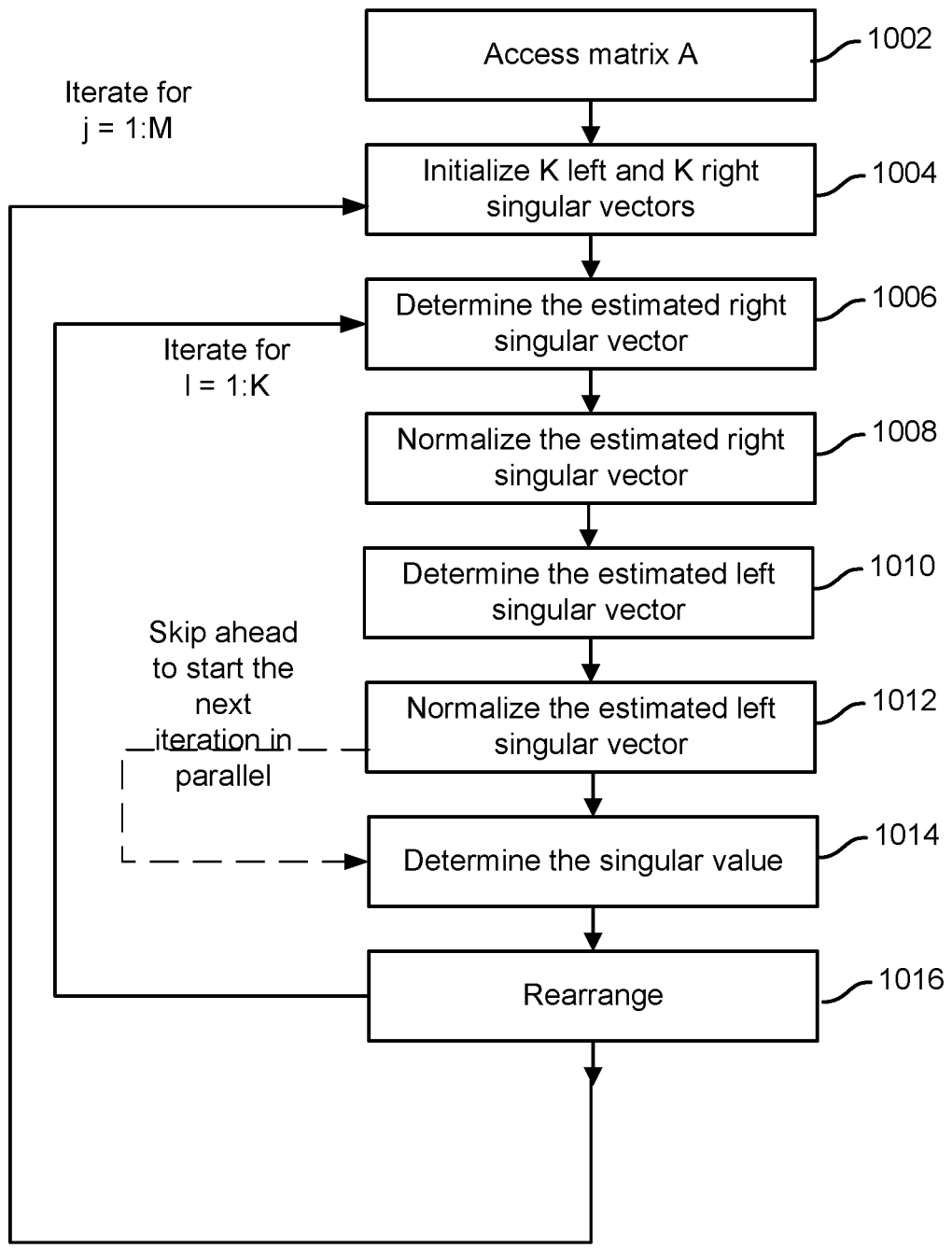
FIG. 10 is a flowchart illustrating another embodiment of a process for performing a SVD on an N×N non-symmetric matrix.

FIG. 10 is a flowchart illustrating another embodiment of a process for performing a SVD on an N×N non-symmetric matrix. Process 1000 can be performed on a system such as 100, 300, or 400.

Process 1000 is preferably applied to a sparse matrix to preserve its sparse nature and preserve the computational efficiencies associated with sparse matrices. Deflation is not required for this process.

At 1002, a matrix A is accessed. The SVD of the matrix is such that $A = U\Sigma V'$.

It is assumed that M (M<N) most significant singular vectors/singular values will be determined (for j=1:M), and to determine one set of singular vectors/singular value the computations are iterated K times (for l=1:K). Thus, 1004-1016 are iterated M times (in other words, for j=1:M). Further, for each j, 1006-1012 are iterated K times (l=1:K). The values of M and K are configurable and can be set depending on the needs of the application.

At 1004, initialization takes place. In this example, the first K left singular vectors $u_1, u_2, \ldots, u_K$ and first K right singular vectors $v_1, v_2, \ldots, v_K$ are initialized with small random numbers. These are the initial guesses for the left or right singular vectors. For example, using Matlab:

$$u_l = \text{rand}(N,1) \text{ and } v_l = \text{rand}(N,1) \text{ for } l=1:K.$$

At 1006, an estimated right singular vector $\tilde{u}_l$ is determined based on the original matrix A as follows:

$$\tilde{u}_l = (A - \sigma_{l-1} u_{l-1} v_{l-1}' - \sigma_{l-2} u_{l-2} v_{l-2}' - \ldots) v_l$$

This equation can be rewritten as:

$$\tilde{u}_l = A v_l - \sigma_{l-1} u_{l-1} (v_{l-1}' v_l) - \sigma_{l-2} u_{l-2} (v_{l-2}' v_l) - \ldots$$

The above computation does not alter A, which means that A can still be used as a sparse matrix for future computations. The terms $-\sigma_{l-j} u_{l-j} (v_{l-j}' v_l)$ are just vector subtractions from the vector $A v_l$. Computing the estimated right singular vector this way does not require deflation of the matrix, thus preserving the sparse nature of matrix A as well as the associated computational efficiencies.

At 1008, the estimated right singular vector $\tilde{u}_1$ is normalized to generate a normalized right singular vector $u_l$:

$$u_l = \frac{\tilde{u}_l}{|\tilde{u}_l|}$$

At 1010, an estimated left singular vector $\tilde{v}_l$ is determined based on a transpose of the original matrix A while preserving the sparse nature of the matrix, as follows:

$$\tilde{v}_l = A' u_l - \sigma_{l-1} v_{l-1} (u_{l-1}' u_l) - \sigma_{l-2} v_{l-2} (u_{l-2}' u_l) - \ldots$$

At 1012, the left singular vector $\tilde{v}_1$ is normalized to generate a normalized right singular vector $v_l$:

$$v_l = \frac{\tilde{v}_l}{|\tilde{v}_l|}$$

After 1006-1012 are repeated K times, convergence should have been achieved.

At 1014, the singular value $\sigma_j$ is computed as follows:

$$\sigma_j = \frac{|\tilde{u}_j|}{|v_j|}$$

The singular values and their corresponding singular vectors are rearranged at specified times at 1016. In this example, the singular values are sorted, and the indices or positions of the singular values can be rearranged in descending order according to the size of the singular values. Further, the order of the corresponding singular vectors is also rearranged in the same way. 1016 does not need to be performed in each iteration cycle. For example, it can be performed every 5 iteration cycles. The reordering allows convergence to be achieved faster.

The process returns to 1004 to start the next iteration cycle. When computing the right or left singular vector in the next iteration stage, the singular values and vectors corresponding to the rearranged locations will be used.

In some embodiments, to obtain the SVD of a non-symmetric matrix H, a process such 800, 900, or 1000 can be performed to obtain its singular value matrix $\Sigma_H$. A symmetric matrix G is constructed where G=H H' is used as a way of monitoring the convergence of the singular values of H. A process such as 500, 600, or 700 can be performed on G to obtain its singular value matrix $\Sigma_G$. $\Sigma_H$ is compared with $\sqrt{\Sigma_G}$ to determine whether $\Sigma_H$ has converged. If the two values are within a threshold distance of each other, then $\Sigma_H$ has converged; otherwise, $\Sigma_H$ has not converged, and more iteration cycles are performed, or the process is restarted with new initial values until convergence is achieved.

Iterative determination of singular values and/or singular vectors of a matrix has been described. The iterative process performs estimation and normalization and achieves higher computational efficiency than conventional techniques. Moreover, the iterative cycles are parallelizable, and implementations on multiple parallel processors and/or specialized hardware further reduce computation time.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method, comprising:
    accessing an original matrix;
    iteratively determining a plurality of estimated singular vectors of the original matrix, a plurality of estimated singular values of the original matrix, or both, using a plurality of parallelizable iteration cycles; wherein:
        at least some of the plurality of parallelizable iteration cycles are performed in parallel on a plurality of processors; and
        the plurality of estimated singular vectors converge to a plurality of actual singular vectors of the original matrix, the plurality of estimated singular values converge to a plurality of actual singular values of the original matrix, or both; and
    outputting the plurality of estimated singular vectors of the original matrix, the plurality of estimated singular values of the original matrix, or both.

2. The method of claim 1, wherein:
    an iterative cycle among the plurality of parallelizable iterative cycles comprises:
        updating an estimated singular vector to obtain an updated estimated singular vector;
        normalizing the updated estimated singular vector to obtain a normalized updated estimated singular vector; and
        determining an estimated singular value based at least in part on the updated estimated singular vector and the normalized updated estimated singular vector.

3. The method of claim 2, wherein the estimated singular vector is initialized to be a random vector.

4. The method of claim 2, wherein:
    the estimated singular vector is updated using at least a current matrix; and
    the iterative cycle further includes deflating the current matrix to generate a next current matrix to be used in a next iterative cycle.

5. The method of claim 2, wherein:
    the original matrix is a sparse matrix; and
    the iterative cycle among the plurality of parallelizable iterative cycles relies on the original matrix in determining the estimated singular vector.

6. The method of claim 2, wherein the iterative cycle further comprises checking a convergence error to determine whether convergence has been achieved.

7. The method of claim 2, wherein:
    the iterative cycle further comprises checking a convergence error to determine whether convergence has been achieved; and
    the convergence error includes an L1-norm or an L2-norm of the estimated singular vector between two consecutive iteration cycles.

8. The method of claim 2, wherein the updating of the estimated singular vector to obtain an updated estimated singular vector includes: multiplying rows of a current matrix with the is estimated singular vector in parallel, or multiplying rows of the original matrix with the estimated singular vector in parallel.

9. The method of claim 2, wherein the updating of the estimated singular vector to obtain the updated estimated singular vector includes projecting the estimated singular vector onto a current matrix to obtain the updated estimated singular vector.

10. The method of claim 1, wherein the iterative determination of the plurality of estimated singular vectors of the original matrix, the plurality of estimated singular values of the original matrix, or both is based at least in part on minimizing an objective function relating to a trace of the original matrix.

11. The method of claim 1, wherein an estimated singular value and a corresponding singular vector are determined in one iteration cycle.

12. The method of claim 1, wherein the iterative determination is not error-driven.

13. The method of claim 1, wherein an iteration cycle of the plurality of parallelizable iteration cycles includes:
    estimating a right singular vector by multiplying a current matrix with an estimated left singular vector;
    normalizing the estimated right singular vector to generate an updated normalized right singular vector;
    estimating a left singular vector by multiplying a transpose of the current matrix with the updated normalized right singular vector;
    normalize the estimated left singular vector to generate an updated normalized left singular vector;
    computing a singular value as a ratio of the updated normalized right singular vector and the updated normalized left singular vector; and
    deflating the current matrix to generate a next current matrix to be used in a next iterative cycle.

14. The method of claim 13, further comprising rearranging computed singular values and singular vectors to facilitate faster convergence.

15. The method of claim 1, wherein an iteration cycle of the plurality of parallelizable iteration cycles includes:
    estimating a right singular vector based at least in part on the original matrix and one or more singular values from one or more previous iteration cycles, one or more left singular vectors from one or more previous iteration cycles, and one or more right singular vectors from one or more previous iteration cycles, to obtain an estimated left singular vector;
    normalizing the estimated right singular vector to generate an updated normalized right singular vector;
    is estimating a left singular vector based at least in part on the original matrix and one or more singular values from one or more previous iteration cycles, one or more left singular vectors from one or more previous iteration cycles, and one or more right singular vectors from one or more previous iteration cycles, to obtain an estimated left singular vector;
    normalize the estimated left singular vector to generate an updated normalized left singular vector; and
    computing the singular value as a ratio of the updated normalized right singular vector and the updated normalized left singular vector.

16. The method of claim 15, further comprising rearranging computed singular values and singular vectors to facilitate faster convergence.

17. The method of claim 1, wherein the original matrix is a non-symmetric matrix; and
the method further comprising:
iteratively determine a singular value matrix of a symmetric matrix, the symmetric matrix being constructed as a product of the non-symmetric matrix and its transpose; and
comparing a singular value matrix of the original matrix with a square root of the singular value matrix of the symmetric matrix to determine whether the iterative determination of the plurality of estimated singular values of the original matrix has achieved convergence.

18. The method of claim 1, wherein the iterative determination of the plurality of estimated singular vectors of the original matrix, the plurality of estimated singular values of the original matrix, or both, is performed without requiring matrix-to-matrix multiplication.

19. A system, comprising:
a plurality of processors configured to:
access an original matrix;
iteratively determine a plurality of estimated singular vectors of the original matrix, a plurality of estimated singular values of the original matrix, or both, using a to plurality of parallelizable iteration cycles; wherein:
at least some of the plurality of parallelizable iteration cycles are performed in parallel on the plurality of processors; and
the plurality of estimated singular vectors converge to a plurality of actual singular vectors of the original matrix, the plurality of estimated singular values converge to a plurality of actual singular values of the original matrix, or both; and
output the plurality of estimated singular vectors of the original matrix, the plurality of estimated singular values of the original matrix, or both; and
one or more memories coupled to the plurality of processors, configured to provide the is plurality of processors with instructions.

20. The system of claim 19, wherein the plurality of processors includes one or more of: a general purpose processor, a microprocessor, a digital signal processor (DSP), a field programmable gate array (FPGA), an application specific integrated circuit (ASIC), and/or a graphical processing units (GPU).

21. A computer program product for matrix processing, the computer program product being embodied in a tangible computer readable storage medium and comprising computer instructions for:
accessing an original matrix;
iteratively determining a plurality of estimated singular vectors of the original matrix, a plurality of estimated singular values of the original matrix, or both, using a plurality of parallelizable iteration cycles; wherein:
at least some of the plurality of parallelizable iteration cycles are performed in parallel on a plurality of processors; and
the plurality of estimated singular vectors converge to a plurality of actual singular vectors of the original matrix, the plurality of estimated singular values converge to a plurality of actual singular values of the original matrix, or both; and
outputting the plurality of estimated singular vectors of the original matrix, the plurality of estimated singular values of the original matrix, or both.

* * * * *

UNITED STATES PATENT AND TRADEMARK OFFICE
CERTIFICATE OF CORRECTION

PATENT NO. : 10,671,697 B1
APPLICATION NO. : 15/901281
DATED : June 2, 2020
INVENTOR(S) : Roy Batruni Page 1 of 1

It is certified that error appears in the above-identified patent and that said Letters Patent is hereby corrected as shown below:

In the Specification

In Column 6, Line(s) 14, delete "$\sigma_a$" and insert --$\sigma_j$--, therefor.

In Column 7, Line(s) 9, delete "$\mathbb{U}_1$" and insert --$\mathbb{U}_j$--, therefor.

In Column 7, Line(s) 35, delete "$\tilde{u}_1$" and insert --$\tilde{u}_j$--, therefor.

In Column 10, Line(s) 2, delete "$\acute{u}_1$" and insert --$\acute{u}_1$--, therefor.

In Column 10, Line(s) 13, after "therefor", insert --$\tilde{u}_1$--.

In Column 12, Line(s) 45, delete "$\tilde{w}_j = \tilde{u}_j + \mu/A_j \tilde{u}_j$" and insert --$\tilde{w}_j = \tilde{u}_j + \mu\, A_j\, \tilde{u}_j$--, therefor.

In Column 14, Line(s) 49, delete "$A_1$" and insert --$A_j$--, therefor.

In Column 19, Line(s) 28, delete "$v_{j,r}$" and insert --$v'_{j,r}$--, therefor.

In the Claims

In Column 22, Claim 8, Line(s) 4, before "estimated" delete "is".

In Column 24, Claim 19, Line(s) 5, before "plurality" delete "is".

Signed and Sealed this
Ninth Day of March, 2021

Drew Hirshfeld
*Performing the Functions and Duties of the*
*Under Secretary of Commerce for Intellectual Property and*
*Director of the United States Patent and Trademark Office*